S. B. MORRISON, D. A. MORRISON, & J. B. MORRISON.
Plow.
No. 5,160. Reissued Nov. 26, 1872.
Fig. 2.
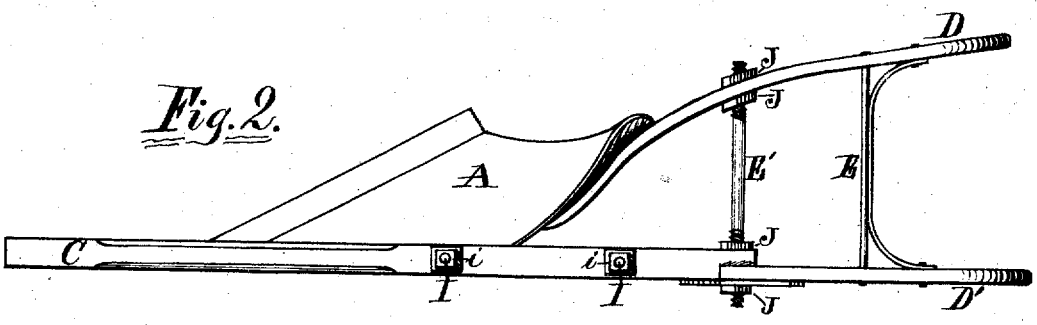
Fig. 3.
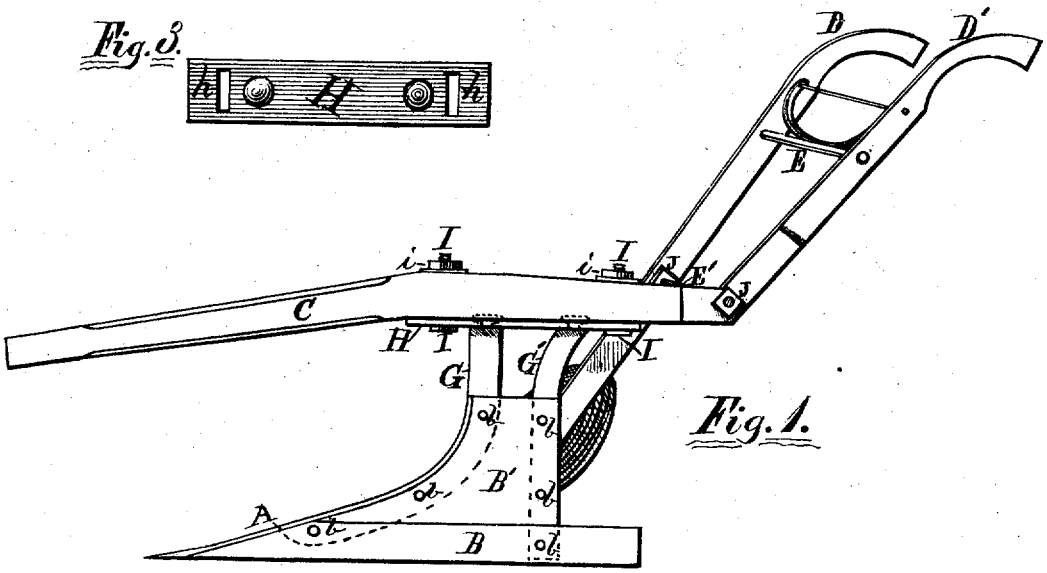
Fig. 1.
Witnesses:
J. J. Tunnicliff.
Wm. Thomas.
Inventors,
Samuel B. Morrison,
Dennis A. Morrison,
& Joseph B. Morrison,
by W. B. Richards,
their atty.
AM. PHOTO-LITHOGRAPHIC CO. N.Y. (OSBORNE'S PROCESS.)

UNITED STATES PATENT OFFICE.

SAMUEL D. MORRISON, DENNIS A. MORRISON, AND JOSEPH B. MORRISON, OF FORT MADISON, IOWA.

IMPROVEMENT IN PLOWS.

Specification forming part of Letters Patent No. 117,801, dated August 8, 1871; reissue No. 5,160, dated November 26, 1872.

*To all whom it may concern:*

Be it known that we, SAMUEL D. MORRISON, DENNIS A. MORRISON, and JOSEPH B. MORRISON, of Fort Madison, in the county of Lee and State of Iowa, have invented certain new and useful Improvements in Plows; and do hereby declare the following to be a full, clear, and exact description thereof, reference being had to the accompanying drawing and to the letters of reference marked thereon.

The nature of our invention consists, first, in cutting off the handle at the beam and supporting it without any portion of the handle or brace thereto extending below the beam; and, second, in the combination of a double standard and slotted beam-plate whereby the plow-beam may be adjusted laterally; all of which will be hereinafter more fully set forth.

In order to enable others skilled in the art to which our invention appertains to make and use the same, we will now proceed to describe its construction and operation, referring to the annexed drawing which forms a part of this specification, and in which—

Figure 1 is a side elevation of a plow embodying our invention. Fig. 2 is a plan view of the same. Fig. 3 is a detached view of the plate H, Fig. 1.

A is the mold-board, which may be constructed in any of the ordinary styles. B is the land-side, constructed and attached to the mold-board A in the usual manner, with an elevated front, B′, constituting what is generally known as a "high land-side." C is the plow-beam. D D′ are the handles. E E′ are the stay-rods connecting the handles D D′. G G′ are the standards, attached to the land-side B B′ by bolts *b b*. H is a plate, a top view of which is shown at Fig. 3, provided with a transverse slot, *h*, at or near each end. The upper ends of the standards G G′ are riveted in the plate H. I I are bolts passing through the slots *h h* and beam C, and having nuts *i i* on their upper ends. J J J are nuts running on the threaded parts of the rod E′, as shown. The lower end of the handle D′, between the beam C and land-side B, is dispensed with, and the handle is attached at its lower end to the rear end of the beam C, as shown in the drawing, thus leaving the space below the beam perfectly open and free. This construction will prevent the difficulties arising from the soil, stubble, &c., clogging on the lower end of said handle, as usually constructed, which must be frequently removed, or else allowed to remain, increasing the draft and interfering with the steady running of the plow.

By tightening up the nuts *i i* the working parts of the plow may be held securely to the beam C. By loosening the nuts *i i* the bolts I I may be slid freely in the lateral slots *h h* in the plate H, and thereby permit of the plow-beam being adjusted laterally to run the plow to or from the land, as required, at the same time turning the nuts J J on the rod E to adjust it to the change of position of the beam C.

Having thus fully described our invention, what we claim as new, and desire to secure by Letters Patent, is—

1. The combination of an ordinary wood plow-beam, C, mold-board A, long handle D secured directly thereto, and short handle D′ secured to the rear end of the beam at an angle of forty-five degrees, or thereabout, and connected by the brace E′ to the mold-board handle, all substantially as shown and described.

2. The arrangement of the beam C and handles D D′ with slotted plate H, standards G G′, bolts I I, rod E, and nuts J J, constructed and operating substantially as and for the purpose specified.

In testimony that we claim the foregoing we have hereunto set our hands this 27th day of June, 1872.

SAMUEL D. MORRISON.
DENNIS A. MORRISON.
JOSEPH B. MORRISON.

Witnesses:
KNUD I. ESPY,
R. W. MCCONN.